US011233788B1

(12) United States Patent
Hitchcock et al.

(10) Patent No.: US 11,233,788 B1
(45) Date of Patent: Jan. 25, 2022

(54) DETERMINING AUTHENTICATION ASSURANCE FROM HISTORICAL AND RUNTIME-PROVIDED INPUTS

(71) Applicant: Amazon Technologies, Inc., Seattle, WA (US)

(72) Inventors: Daniel Hitchcock, Bothell, WA (US); Yogesh Golwalkar, Pune (IN); Dharinee Gupta, Dharamshala (IN); Bharath Kumar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 412 days.

(21) Appl. No.: 16/201,958

(22) Filed: Nov. 27, 2018

(51) Int. Cl.
*H04L 29/06* (2006.01)
*H04L 9/32* (2006.01)
*G06F 21/32* (2013.01)
*G06F 21/31* (2013.01)

(52) U.S. Cl.
CPC ........ *H04L 63/0861* (2013.01); *G06F 21/316* (2013.01); *G06F 21/32* (2013.01); *H04L 9/3271* (2013.01); *H04L 63/0884* (2013.01)

(58) Field of Classification Search
CPC ............. H04L 63/0861; H04L 63/0884; H04L 9/3271; H04L 2463/082; G06F 21/316; G06F 21/32
See application file for complete search history.

(56) References Cited

U.S. PATENT DOCUMENTS

| | | | | |
|---|---|---|---|---|
| 8,627,438 | B1* | 1/2014 | Bhimanaik | G06F 21/36 726/9 |
| 8,904,506 | B1* | 12/2014 | Canavor | G06F 16/00 726/7 |
| 9,124,570 | B1* | 9/2015 | Asher | H04L 63/08 |
| 9,485,237 | B1* | 11/2016 | Johansson | H04L 9/3231 |
| 9,654,477 | B1* | 5/2017 | Kotamraju | H04L 63/102 |
| 9,923,927 | B1* | 3/2018 | McClintock | H04L 63/108 |
| 10,007,779 | B1* | 6/2018 | McClintock | G06F 21/45 |
| 10,911,425 | B1 | 2/2021 | Hitchcock et al. | |
| 2014/0189808 | A1* | 7/2014 | Mahaffey | H04L 63/083 726/4 |
| 2016/0087957 | A1* | 3/2016 | Shah | H04L 63/08 726/1 |
| 2017/0063871 | A1* | 3/2017 | Kashiyama | H04L 63/104 |
| 2017/0374070 | A1* | 12/2017 | Shah | H04L 63/105 |
| 2018/0013782 | A1* | 1/2018 | Choyi | H04L 63/083 |
| 2020/0162515 | A1* | 5/2020 | Dubinsky | G06N 20/00 |

* cited by examiner

*Primary Examiner* — James R Turchen
(74) *Attorney, Agent, or Firm* — Thomas | Horstemeyer, LLP

(57) ABSTRACT

Disclosed are various embodiments for determining authentication assurance from a combination of historical and runtime-provided inputs. An authentication request associated with an account is received. A composite measure of authentication assurance is determined from a combination of a historical measure of authentication assurance and a runtime measure of authentication assurance. A response to the authentication request is generated based at least in part on the composite measure of authentication assurance.

21 Claims, 7 Drawing Sheets

DETERMINING AUTHENTICATION ASSURANCE FROM HISTORICAL AND RUNTIME-PROVIDED INPUTS

BACKGROUND

In order to access network services, users are requested to present security credentials, such as usernames and passwords, for authentication. Many services have transitioned to multi-factor authentication, where additional types of authentication factors may be required for authentication. This is to increase security and avoid account compromises in situations where a single authentication factor is compromised. Even with services that use multi-factor authentication, users may not be required to provide all factors for each log-in. For example, a user may be required to provide an additional authentication factor no more than once per device per month.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
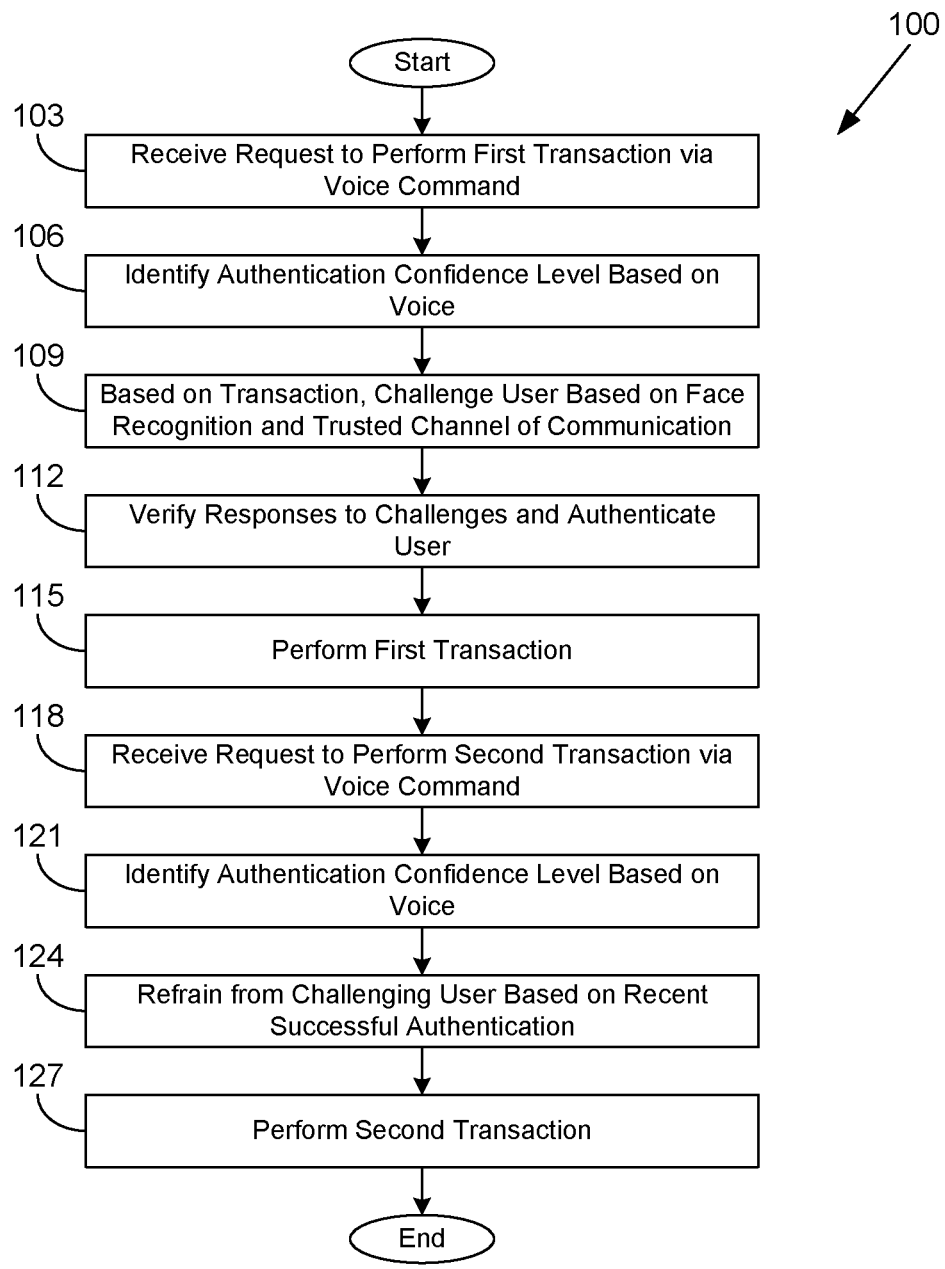
FIG. 1 is a flowchart showing an example scenario involving authentication assurance in accordance with one or embodiments of the present disclosure.

The present disclosure relates to determining authentication assurance. Authentication assurance is a concept pertaining to the confidence that a system has in authenticating a user, or verifying that the user is who he or she claims to be. While past systems authenticated users simply on the basis of providing a correct username and password combination, contemporary systems are often configured to use a variety of authentication factors, including, for example, voice recognition, facial recognition, fingerprint recognition, one-time codes sent through a trusted communications channel, answers to preconfigured or transaction-focused knowledge-based questions, and so on.

Although authentication systems may have the capability to use a multiplicity of factors, requiring a user always to provide every factor could result in a diminished user experience. Also, some factors may be more easily provided by a user than others. For example, voice recognition could be automatically performed on a voice command issued by a user, but an authentication factor involving a one-time code sent to the user's phone could force the user to perform several steps to locate the phone, unlock it, open a messaging program, and provide the code back to the authentication system.

Various embodiments of the present disclosure involve determining a measure of authentication assurance, which can in turn be used to determine how to authenticate a user. An authentication system may determine that a first user has a relatively low level of authentication assurance, meaning that the system is not highly confident that the user is who he or she claims to be. By contrast, the system may determine that a second user has a relatively high level of authentication assurance, meaning that the system is highly confident in the veracity of the user's purported identity. Accordingly, the system may prompt the first user to provide a combination of additional authentication factors to confirm his or her identity, while not requiring the second user to provide those same factors.

Moreover, the transaction or level of access requested by the user may implicate different required levels of authentication assurance. For instance, the first user having a relatively low level of authentication assurance because authentication factors have not been provided recently may not need to provide additional authentication factors if a transaction requested by the first user does not require increased authentication assurance. Conversely, the second user having a relatively high level of authentication assurance because an authentication factor was recently provided may still need to provide an additional authentication factor when requesting to perform a critical transaction.

In a set of embodiments, a measure of authentication assurance may be determined from a composite or combination of both user-level and account-level indicators. This recognizes that the concept of a user is distinct from an account, or in other words, an account may be shared by multiple users. For example, a living-room device such as a television or voice interface device may access resources of a particular account, but multiple users, such as different family members, roommates, or visitors, may interact with the device via the particular account. The account itself may be associated with a measure of authentication assurance that is independent or distinct from a measure of authentication assurance for each user. A composite measure of authentication assurance may be determined from a combination of the user-level measure and the account-level measure.

In another set of embodiments, a measure of authentication assurance may be generated using an algorithmic decay approach. In particular, a current measure of authentication assurance is based at least in part on one or more previously completed authentication activities, where the assurance contributed by each activity is controlled or influenced by the application of a decay algorithm considering at least the time elapsed since the authentication activity was completed. A logarithmic decay model may be used to decrease the assurance contribution relatively quickly but not reach zero, where a non-zero value can be deemed sufficient for some authentication requests requiring a relatively low level of authentication assurance.

In still another set of embodiments, a measure of authentication assurance may be determined from a composite or combination of both historical and runtime-provided inputs. A measure of authentication assurance may be provided by historical authentication events, whose contribution to the assurance may decay over time, in combination with events or data provided at the time of the authentication request.

Such runtime-provided inputs can include, for example, a confidence level for voice recognition or face recognition.

As one skilled in the art will appreciate in light of this disclosure, certain embodiments may be capable of achieving certain advantages, including some or all of the following: (1) an efficient user interface and reduced computer hardware resource consumption (i.e., memory usage, processor time, and network resources) by avoiding authentication challenges that are unnecessary to perform a requested transaction in view of a measure of authentication assurance; (2) an improved user experience by allowing authentication to occur even though certain types of authentication challenges cannot be used (e.g., skipping an authentication challenge for a user based on receiving a cellular telephone-based communication when the user traveling out of range of cellular telephones); (3) increased flexibility and improved computer and network security resulting from applying an algorithmic decay model to authentication events rather than hardcoded expiration times that may not be accurate in many situations; (4) improved computer and network security by considering separate user-level and account-level authentication assurance measures in determining a composite measure of authentication assurance; (5) improved computer and network security by considering both historical and runtime-provided inputs in determining a composite measure of authentication assurance; (6) an efficient user experience by allowing authentication after fewer or easier authentication challenges selected to only minimally meet a required authentication assurance measure; and so forth.

Turning now to FIG. 1, shown is an example flowchart 100 illustrating an example scenario involving authentication assurance in accordance with one or more embodiments. Beginning with box 103, a voice interface device receives a request to perform a first transaction via a voice command. For example, the user may verbally command the voice interface device to place an order for an item to be shipped to a particular address. In box 106, an authentication confidence level as to the user's identity is identified based at least in part on the user's voice. Voice recognition may be a relatively weak form of authentication, and depending on the voice sample, the authentication confidence level may be relatively low.

In box 109, the system determines to challenge the user based upon face recognition and also via a trusted channel of communication. For example, the user may be instructed to look into a particular camera for face recognition and also to click on a notification sent to the user's registered smartphone. The determination to challenge the user is based at least in part on the first transaction to be performed. That is, if the first transaction were relatively low value, the authentication confidence level identified in box 106 may be sufficient. However, in this example, the first transaction is of sufficiently high value in view of the identification authentication confidence level in order to require the user to participate in one or more additional authentication challenges. In box 112, the system authenticates the user's responses to the challenges and authenticates the user. In box 115, the system performs the first transaction.

In box 118, the voice interface device receives a request to perform a second transaction via a voice command. In box 121, an authentication confidence level as to the user's identity is again identified based at least in part on the user's voice. In box 124, the system refrains from presenting additional authentication challenges to the user based at least in part on the user's recent successful authentication in box 112. For example, the system may apply an exponential time decay to the authentication assurance contributed by the challenge responses in box 112, and the passage of time between box 112 and 118 may be less than that required to reduce the measure of authentication assurance below a threshold required to perform the second transaction. Consequently, having authenticated the user, the system performs the second transaction in box 127. In the following discussion, a general description of the system and its components is provided, followed by a discussion of the operation of the same.

Figure 2:
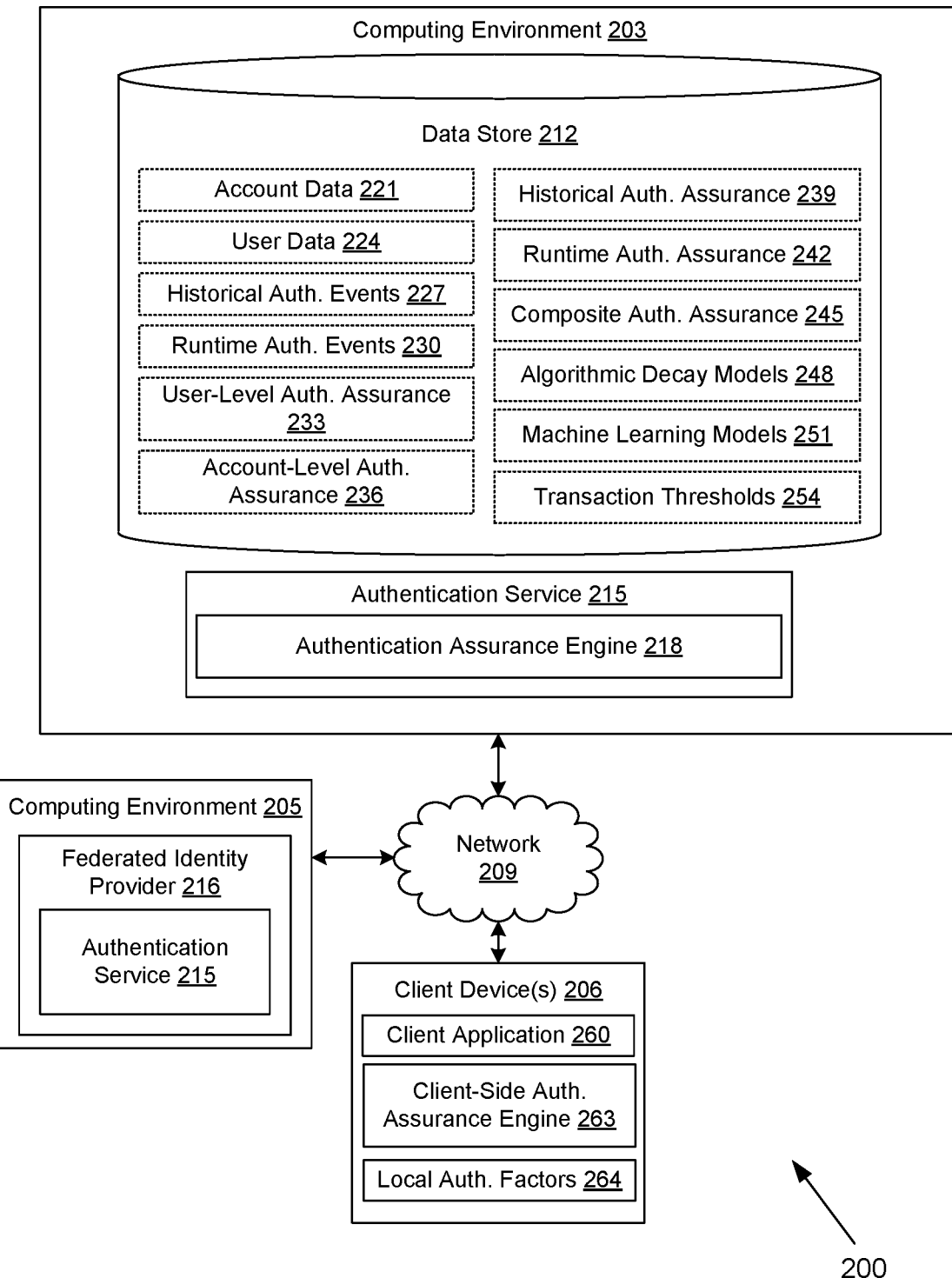
FIG. 2 is a schematic block diagram of a networked environment according to various embodiments of the present disclosure.

With reference to FIG. 2, shown is a networked environment 200 according to various embodiments. The networked environment 200 includes computing environments 203 and 205 and one or more client devices 206, which may be in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

In various embodiments, the computing environment 203 implements an electronic commerce system that facilitates online browsing and placing orders for items. To this end, the computing environment 203 may include components such as product catalogs, item search engines, network page generation services, network page servers, checkout services, order pipeline services, and so forth, that collectively implement an electronic shopping experience for a network site. Such services would enable functions such as searching for items using search query, browsing for items within a category listing, viewing additional or detailed information about items, adding items to a shopping list, initiating an order for an item, designating shipping and payment information, and other functions. Additionally, or alternatively, the computing environment 203 may implement other services such as video streaming, music streaming, online gaming, security system monitoring, payment services, banking services, and other services.

The components executed on the computing environment 203, for example, include an authentication service 215 and other applications, services, processes, systems, engines, or functionality not discussed in detail herein. The authentication service 215 is executed to authenticate client devices 206 and users for access to account-based resources such as network services and/or to perform transactions. For example, the authentication service 215 may provide access to online shopping, video streaming, online gaming, security system monitoring, payment services, banking services, and so on. The authentication service 215 causes responses to authentication requests to be generated based at least in part on comparing a measure of authentication assurance to a threshold.

In some embodiments, the authentication service 215 may be operated as part of a federated identity provider 216 that performs identity management for third parties. The federated identity provider 216 may operate within a computing environment 205 that may be physically and logically isolated from the computing environment 203 or the client device 206. That is, the computing environment 205 may be separate and distinct from the computing environment 203 and the client device 206. The computing environment 205 may be coupled to a network that is separate and distinct from the network 209. However, if the authentication service 215 is operated as part of the federated identity provider 216, the authentication service 215 may have access only to a limited set of data or signals from third parties. In such situations, the third parties may provide genericized indications of authentication assurance or lack thereof rather than the underlying data.

Further, the authentication service 215 may be implemented at different logical points of the network 209 in various embodiments. For example, the authentication service 215 may be implemented on a user's home network, being part of or operating in conjunction with the user's network attached storage (NAS) device. The authentication service 215 may be implemented within or as part of a content delivery network (CDN).

The authentication service 215 includes an authentication assurance engine 218 that determines a measure of authentication assurance associated with an authentication request and determines whether additional authentication challenges are necessary in view of the measure of authentication assurance. Different requested transactions may be associated with different authentication assurance thresholds, meaning that the authentication assurance engine 218 may present additional authentication challenges for some transactions but not others in view of the same measure of authentication assurance.

The data stored in the data store 212 includes, for example, account data 221, user data 224, historical authentication events 227, runtime authentication events 230, a user-level authentication assurance 233, an account-level authentication assurance 236, a historical authentication assurance 239, a runtime authentication assurance 242, a composite authentication assurance 245, one or more algorithmic decay models 248, one or more machine learning models 251, one or more transaction thresholds, and potentially other data.

The account data 221 includes data regarding accounts with a network service, where the accounts may be used to obtain secured or unsecured resources or perform transactions. The account data 221 may include security credentials, such as usernames, passwords, answers to knowledge-based questions, keys, and/or other credentials. The account data 221 may include information about one or more trusted channels of communication (e.g., email addresses, telephone numbers, mobile devices, etc.) through which authentication challenges may be sent. Such channels are deemed trusted as it would be unlikely that unauthorized individuals would have access to communications received through those channels. The account data 221 may record information regarding client devices 206 previously used to access the accounts.

The user data 224 includes data relating to individual users of one or more accounts. The user data 224 may include security credentials, which may be distinct from the security credentials for an account. For example, the user data 224 may include biometric profile information to uniquely identify a user by voice recognition, face recognition, fingerprint recognition, or other biometric identifiers. The user data 224 may record client devices 206 previously used by the users.

It is noted that an account may be shared by a plurality of users, or unique individuals who should have access to resources or to perform transactions through the account. For example, a streaming video account may be shared among multiple members in a household. One or more of the users may be given full access, while one or more others of the users may be given restricted access. For example, parental controls may prevent child users from making purchases or consuming unapproved content. Also, in some cases, a user may have access to multiple different accounts. As used herein, a "user" may refer to a person and/or an electronic interface performing an automated task.

The historical authentication events 227 may correspond to timestamped events or indicators of authentication assurance that may support or oppose authentication of a user for access to an account via a client device 206. For example, a historical authentication event 227 may indicate that a particular user provided a certain security credential at a certain time to access a certain account using a certain client device 206. Alternatively, a historical authentication event 227 may indicate that a particular client device 206 provided an incorrect security credential to access a certain account at a certain time.

The runtime authentication events 230 correspond to indicators of authentication that are received along with or relative to an authentication request. The term "runtime" refers to data that is determined when an authentication request is performed, as compared to historical data. To this end, the runtime authentication events 230 may include biometric recognition data corresponding to a command that prompted the authentication request. For example, if a user at a voice interface device tells the device to place an order for a certain item, the runtime authentication event 230 may include voice recognition information indicating an authentication confidence level for the user who spoke the command. The runtime authentication events 230 may include information about the requesting client device 206, including a location determined through the global positioning system (GPS), network address geolocation, or another approach, environmental factors associated with an environment surrounding the client device 206, and/or other information.

The user-level authentication assurance 233 is a measure of authentication assurance computed at the user level. Because this measure is user focused, the user-level authentication assurance 233 may look at the history of the user in authenticating via one or more other accounts, previous suspicious or inconclusive activity of the user, or other user-associated metrics. For example, the user-level authentication assurance 233 may be based on confidence associated with recognizing the user's voice from a voice sample, confidence associated with recognizing the user's face from a captured image or video, confidence associated with recognizing the user's fingerprint as scanned by a fingerprint scanner, confidence that a user's personal device is still in possession of the user, and so on.

The user-level authentication assurance 233 may correspond to one or more personas of the user. Users may operate under different but consistent patterns of behavior, or personas. For example, a user may have different personas for work or home, or in other words, what the user does during the data while working may be different from what the user does at home. Thus, what a user does under a first persona may be completely normal, but if the user does the same thing under a second persona, it may be a reason to flag the activity, reduce the user-level authentication assurance 233, and prompt another authentication challenge.

By contrast, the account-level authentication assurance 236 is a measure of authentication assurance computed at the account level. As used herein in the computer hardware and software perspectives, an account is a computer-based entity that entitles one or more users to access protected local or networked computer resources provided by a computing system when the user or users are identified. As non-limiting examples, an account may be used to access a video streaming service, or to engage in a personalized online shopping experience.

The account-level authentication assurance 236 may take into account behavior of other users relative to the particular account, including whether the account has previously been compromised. The account-level authentication assurance 236 may also take into account factors that would tend to indicate that the account is unlikely to be compromised, such as if only single client device 206 in a secured location is approved for access to the account. For example, the account-level authentication assurance 233 may be based on an authentication failure caused by one of several users of the account, such as providing an incorrect account password, or other suspicious interactions that may or may not involve the current user.

The historical authentication assurance 239 is a measure of authentication assurance computed on the basis of historical indicators from the historical authentication events 227. In computing the historical authentication assurance 239, an algorithmic time decay can be applied to individual authentication assurance values associated with the historical authentication events 227. The runtime authentication assurance 242 is a measure of authentication assurance computed on the basis of runtime indicators from the runtime authentication events 230.

The composite authentication assurance 245 corresponds to a combination or composite of constituent authentication assurance measures. For example, the composite authentication assurance 245 may include a combination of a historical authentication assurance 239 with a runtime authentication assurance 242, and/or a combination of a user-level authentication assurance 233 with an account-level authentication assurance 236. In some embodiments, the constituent components of the composite authentication assurance 245 may be weighted differently.

The algorithmic decay models 248 control the application of an algorithmic time decay to authentication assurance values contributed by historical authentication events 227. For example, the algorithmic time decay may be an exponential time decay. Exponential decay may be preferable to linear decay as authentication assurance is not evenly distributed with respect to time. In one implementation, the maximum authentication assurance value is one, while the minimum authentication assurance value is 0.051, or a decayed value after thirty days. The half-life is the time in which the value decays to half of the original value. In one implementation, the half-life is defined as seven days. In some cases, the half-life value may depend on whether the client device 206 associated with the historical authentication event 227 is shared by multiple users or is a personal device used by only one user. The decay constant used for the time decay is ln(2) divided by the half-life value.

The machine learning models 251 are used to determine the authentication assurance associated with various historical authentication events 227 and/or runtime authentication events 230 based upon observing which events are associated with account or user compromises. A machine learning model 251 is trained on the events associated with known compromises. However, it is noted that the compromises may not be discovered until a relatively long time period after the compromises occur. Thus, machine learning model 251 can help in assessing the authentication assurance of events that might not be finally determined to be compromises until months later. For instance, a runtime authentication assurance 242 can be determined based at least in part on a machine learning model 251 applied to a runtime-provided input and trained on historical data associated with a plurality of different accounts.

The transaction thresholds 254 correspond to authentication assurance levels for which transactions are permitted to occur. It is recognized that different types of transactions may require different thresholds. For example, some low-value transactions may be always permitted despite a very low authentication assurance, while other high-value transactions may almost always require an additional authentication challenge to be presented. The transaction thresholds 254 may be determined based at least in part on data indicating actual compromises compared to authentication assurance values. For example, a machine learning model 251 may be trained to determine or adjust the transaction thresholds 254 for each type of transaction.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display such comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 260 and/or other applications. The client application 260 may be executed in a client device 206, for example, to access network content served up by the computing environment 203 and/or other servers, thereby rendering a user interface. To this end, the client application 260 may comprise, for example, a browser, a dedicated application, etc., and the user interface may comprise a network page, a web page, a graphical user interface, an application screen, a gesture-based interface, a speech-based interface, etc.

The client device 206 may also execute a client-side authentication assurance engine 263. The client-side authentication assurance engine 263 may be executed to compute an initial authentication assurance level based upon analysis of runtime indicators available at the client device 206. For example, the client-side authentication assurance engine 263 may perform a verification on a voice sample, a facial image, a fingerprint scan, or other biometric information, and then transmit the results to the authentication service 215 over the network 209. The result may be a profile of the biometric information or may be classified as an initial authentication confidence value or level.

Also, the client-side authentication assurance engine 263 may be used to provide authentication assurance levels when the authentication service 215 cannot be reached, for example, due to loss of network 209 connectivity. The authentication assurance measures from the client-side authentication assurance engine 263 may be used to grant or deny access to locally cached resources on the client device 206 or network-attached storage of the local network 209. For example, the client-side authentication assurance measure can be used to grant or deny access to locally cached digital content owned by a particular user. The client device 206 may be configured to execute applications beyond the client application 260 and the client-side authentication assurance engine 263 such as, for example, email applications, social networking applications, word processors, spreadsheets, and/or other applications.

The client device 206 may also be associated with one or more local authentication factors 264. These local authentication factors 264 may comprise hardware or software tokens, trusted platform modules, and/or other secure hardware capable of securely generating one-time passwords or codes for use in authentication via the authentication service 215.

Authentication assurance is conceptually related to confidence-based authentication as described in U.S. patent application Ser. No. 13/277,026 titled "CONFIDENCE-BASED AUTHENTICATION" and filed Oct. 19, 2011, issued as U.S. Pat. No. 8,621,209, and U.S. patent application Ser. No. 14/105,836 titled "CONFIDENCE-BASED AUTHENTICATION" and filed Dec. 13, 2013, issued as U.S. Pat. No. 9,485,237, which are both incorporated herein by reference in their entireties.

Figure 3:
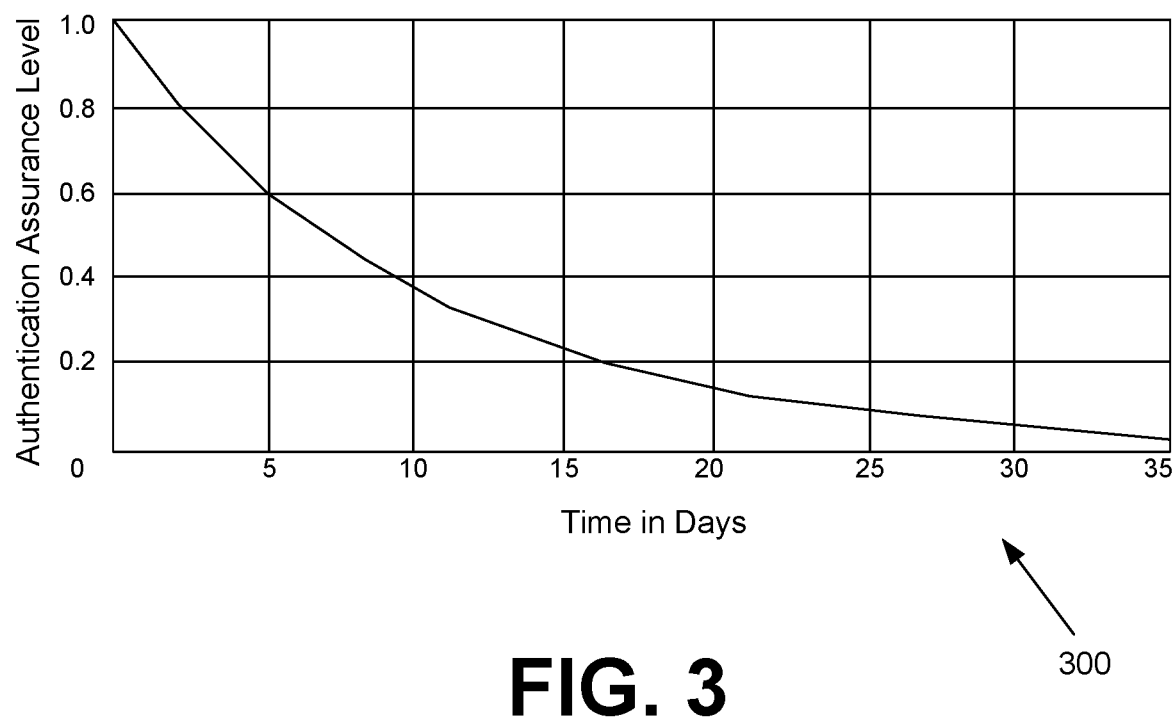
FIG. 3 is a graph that illustrates an example algorithmic decay over time of an authentication assurance level.

Moving on to FIG. 3, shown is a graph 300 that illustrates an example algorithmic decay over time of an authentication assurance level. In this example, an authentication assurance level begins initially at a value of 1.0, when the user successfully passes the authentication challenge. Over time, the value of the authentication assurance level drops in accordance with an exponential decay. The drop in the authentication assurance over time occurs because the risk that the account, client device 206 (FIG. 2), or other systems may be compromised increases in the time following a successful authentication. For instance, a client device 206 may be stolen or used inappropriately by another user in the time following the successful authentication. At approximately one week in this example, the authentication assurance level has dropped to near 0.5, or one-half of its original value. By thirty-five days in this example, the authentication assurance level has dropped to a negligible value. When the user is responds successfully to authentication challenges, the authentication assurance level rises again.

Although FIG. 3 depicts a continuous decay, it is understood that an algorithmic decay model 248 (FIG. 2) may take into account additional signals that may introduce discontinuities in the decay. For example, information may be obtained that a particular authentication factor is susceptible to being compromised (e.g., due to an encryption vulnerability), and this information may cause any authentication assurance contributed by that particular authentication factor to be immediately nullified or reduced to a minimum value. In addition, policies may override the algorithmic decay model 248 to indicate that certain client devices 206, accounts, or users should always be presented with challenges or never be presented with challenges to perform particular transactions.

Figure 4:
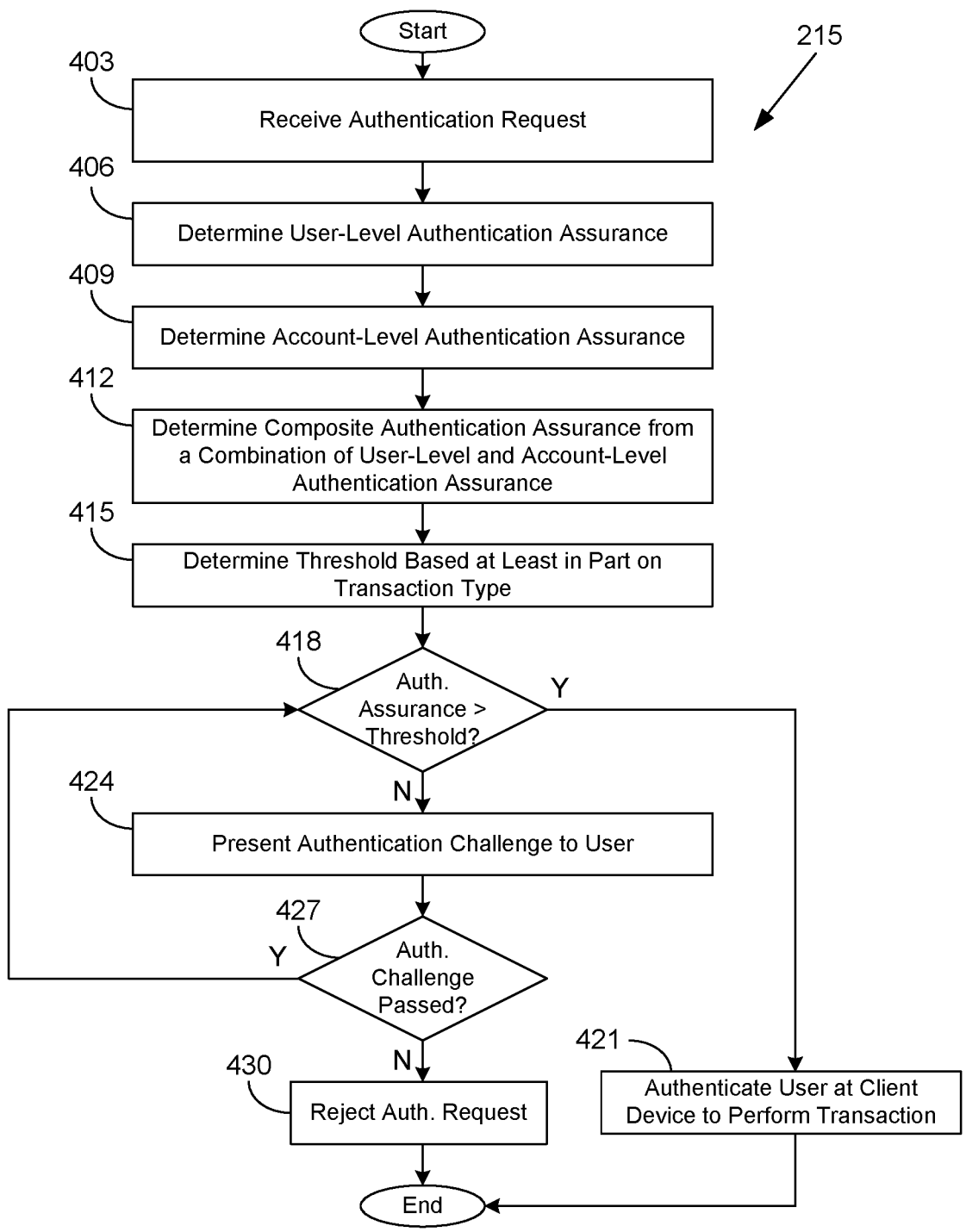
FIGS. 4-6 are flowcharts illustrating examples of functionality implemented as portions of an authentication service executed in a computing environment in the networked environment of FIG. 2 according to various embodiments of the present disclosure.

Referring next to FIG. 4, shown is a flowchart that provides one example of the operation of a portion of the authentication service 215 according to various embodiments. It is understood that the flowchart of FIG. 4 provides merely an example of the many different types of functional arrangements that may be employed to implement the operation of the portion of the authentication service 215 as described herein. As an alternative, the flowchart of FIG. 4 may be viewed as depicting an example of elements of a method implemented in the computing environment 203 (FIG. 2) according to one or more embodiments.

Beginning with box 403, the authentication service 215 receives an authentication request via a network 209 (FIG. 2) responsive to an input by a user via a user interface. The request may be received directly, or in some embodiments, indirectly, from a client device 206 (FIG. 2). The request may be received from a proxy device or another service, such as an identity provider, etc. The client device 206 is associated with an account. The authentication request may correspond to an explicit request to log into an account or a request to access a secured resource or perform a transaction, where accessing the secured resource or performing the transaction requires authentication of the user. In one scenario, if there is no specific user input provided, the authentication service 215 may determine the authentication assurance as being no confidence at all or no user indication at all.

In box 406, the authentication service 215 determines a measure of user-level authentication assurance 233 (FIG. 2) for the user. This can involve examining runtime authentication events 230 (FIG. 2) or indicators associated with the authentication request that would indicate whether the user is who he or she claims to be. For example, the runtime authentication events 230 can include inherence factors, such as biometric data for the user, including a speech sample, fingerprint scan, facial image, or other biometric data, obtained by the client application 260 (FIG. 2) concurrently with the authentication request. The runtime authentication events 230 may also include knowledge factors like passwords, identification numbers, security questions, recent purchase questions, and so on. The runtime authentication events 230 may also include possession factors such as keys, one-time passwords (e.g., such as those generated by the local authentication factors 264 (FIG. 2) or tokens), and so on.

Determining the measure of user-level authentication assurance 233 can also involve examining historical authentication events 227 (FIG. 2) or indicators from previous interactions that would indicate historical trustworthiness or compromise history associated with the user. For example, if it has been a relatively long time period since the user has provided a correct security credential in the historical authentication events 227, that may weigh toward a lower user-level authentication assurance 233 as the authentication assurance contributed by providing the correct security credential decays over time. By contrast, if the user always succeeds at performing a certain authentication challenge, the client device 206 may be considered trustworthy and a repeat challenge may be skipped. The user-level authentication assurance 233 may take into account history of the user with respect to potentially multiple accounts, including accounts additional to the one associated with the authentication request. In some cases, the user-level authentication assurance 233 may be based at least in part on information provided by the client-side authentication assurance engine 263 (FIG. 2).

In some cases, the user may be an unrecognized user, or a user who is not one of a set of enumerated users associated with the account. In such cases, the user-level authentication assurance 233 may be a zero or null value. In various scenarios, such users may be prohibited from performing an account transaction or allowed to perform an account transaction provided that the measure of account-level authentication assurance 236 (FIG. 2) is sufficient relative to a threshold.

In box 409, the authentication service 215 determines a measure of account-level authentication assurance 236 for the account. Like the user-level measure, the account-level authentication assurance 236 may consider both historical authentication events 227 and runtime authentication events 230. However, the account-level authentication assurance 236 may also consider behavior of users other than the user associated with the request. The account-level authentication assurance 236 may also consider whether the account has been previously compromised or other information that may not be related to the user associated with the authentication request. In some cases, the account-level authentication assurance 236 may be based at least in part on information provided by the client-side authentication assurance engine 263.

In box 412, the authentication service 215 determines a composite authentication assurance 245 (FIG. 2) that is a combination of both the user-level authentication assurance 233 and account-level authentication assurance 236. For example, the user-level authentication assurance 233 and the account-level authentication assurance 236 may each be weighted by a respective (and possibly different) weighting value and then summed together to create the composite measure. In some cases, in computing the composite authentication assurance 245, the contribution of the user-level authentication assurance 233 may be nullified in response to the account-level authentication assurance 236 meeting a threshold, or the contribution of the account-level authentication assurance 236 may be nullified in response to the user-level authentication assurance 233 meeting a threshold. As used herein, a value meeting a threshold may be a value exactly equal to or greater than the threshold, where the threshold is a minimum value, or a value exactly equal to or lesser than a threshold, where the threshold is a maximum value.

In box 415, the authentication service 215 determines a threshold from the transaction thresholds 254 (FIG. 2) based at least in part on a type or value of transaction requested in the authentication request. For example, some transactions may be a relatively low risk, requiring a relatively low threshold of authentication assurance, but other transactions may be relatively high risk, requiring a relatively high threshold of authentication assurance.

In box 418, the authentication service 215 determines whether the composite authentication assurance 245 meets the threshold. If the authentication service 215 determines that the composite authentication assurance 245 meets the threshold, the authentication service 215 moves to box 421 and authenticates the user at the client device 206 to perform the requested transaction. Thus, the authentication can be performed without a further authentication challenge. The authentication service 215 may issue a new token indicating authentication to the client device 206 or associate an existing token of the client device 206 with the authenticated state. In some cases, a different client device 206 may be authorized to perform the transaction other than the client device 206 that originated the authentication request. For example, a user might request via a voice interface device that a digital movie be purchased and played via a television device, and the authorized transaction may be to show the movie on the television device. Also, the issued token may be valid for the particular user, any user including unrecognized users, recognized users, or a subset of recognized users. Thereafter, the operation of the portion of the authentication service 215 ends.

If instead the authentication service 215 determines that the composite authentication assurance 245 does not meet or falls beneath the threshold, the authentication service 215 moves to box 424 and presents one or more authentication challenges to the user. For example, the authentication challenges may require the user to provide a biometric identifier, answer a knowledge-based question, select a link or notification sent to a mobile phone, select a link in an email, provide a code sent through a trusted channel of communication, enter a password, and/or provide other information that can be used to confirm the user's identity. It is noted that the authentication challenges can be presented and responded through the same client device 206 that originated the authentication request or through different client devices 206.

In some cases, for the sake of user experience, the authentication service 215 may elect to forego one or more authentication challenges. For example, when runtime indicators show that the user's client device 206 is currently connected to airplane Wi-Fi, it would not be practical for the user to answer an authentication challenge involving a trusted channel of communication related to short message service (SMS) or calls to a mobile phone. To this end, the authentication service 215 may select an alternative authentication challenge (e.g., an email to a trusted email address) from the possible authentication challenges or avoid an authentication challenge entirely while the user's client device 206 is connected to airplane Wi-Fi.

In box 427, the authentication service 215 determines whether the user has passed the authentication challenge(s). In some cases, the user may have to pass only a subset of the set of authentication challenges presented in box 424 in order to be authenticated. If the authentication challenge(s) are not passed, the authentication service 215 moves from box 427 to box 430 and rejects the authentication request. As a consequence, the requested transaction is not performed, and the client device 206 is precluded from accessing the associated secured resource of the account. Thereafter, the operation of the portion of the authentication service 215 ends.

If the authentication service 215 determines instead in box 427 that the authentication challenge(s) are passed, the authentication service 215 returns from box 427 to box 418 and reevaluates whether the composite authentication assurance 245 meets the threshold considering authentication assurance contribution of passing the authentication challenge(s). The authentication service 215 may follow this with additional challenges in box 424 or authenticating the user in box 421.

Figure 5:
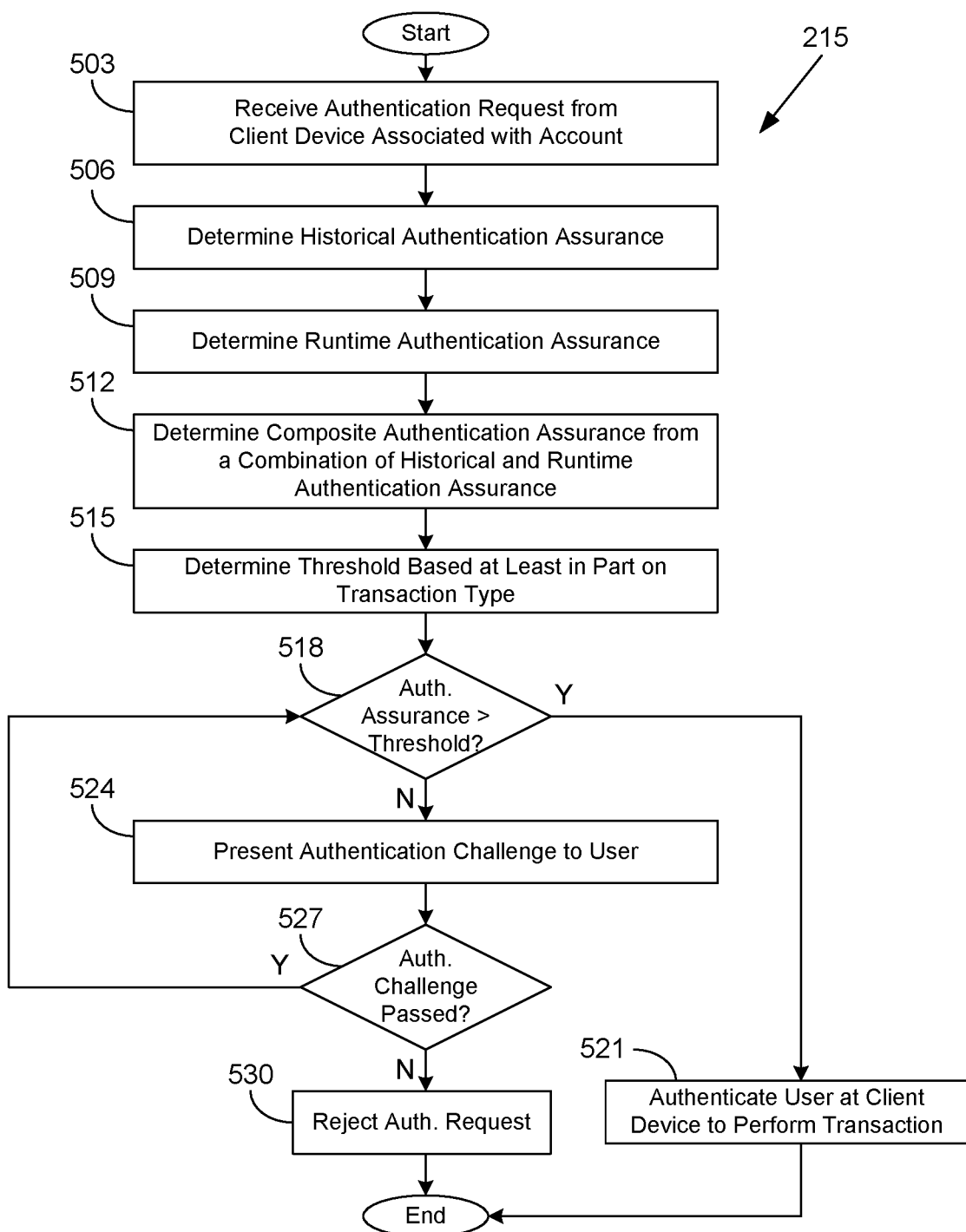

Moving on to FIG. 5, shown is a flowchart that provides one example of the operation of a portion of the authentication service 215 according to various embodiments. It is understood that the flowchart of FIG. 5 provides merely an example of the many different types of functional arrangements that may be employed to implement the operation of the portion of the authentication service 215 as described herein. As an alternative, the flowchart of FIG. 5 may be viewed as depicting an example of elements of a method implemented in the computing environment 203 (FIG. 2) according to one or more embodiments.

Beginning with box 503, the authentication service 215 receives an authentication request via a network 209 (FIG. 2). The request may be received directly or indirectly from a client device 206 (FIG. 2) associated with an account. Alternatively, the request may be received from a proxy device or another service, such as an identity provider. The authentication request may correspond to an explicit request to log into an account or a request to access a secured resource or perform a transaction, where accessing the secured resource or performing the transaction requires authentication.

In box 506, the authentication service 215 determines a measure of historical authentication assurance 239 (FIG. 2) for the account. This involves examining indicators from previous interactions that would indicate historical trustworthiness or compromise history associated with the account. For example, if it has been a relatively long time period since a correct security credential has been provided for the account in the historical authentication events 227 (FIG. 2), that may weigh toward a lower historical authentication assurance 239. It is noted that the historical authentication events 227 may be associated with an authentication assurance value that is exponentially time decayed as will be described in connection with the flowchart of FIG. 6.

In box 509, the authentication service 215 determines a measure of runtime authentication assurance 242 (FIG. 2) for the account. In so doing, the authentication service 215 may take into account runtime indicators of risk or trustworthiness, which include geographic location of the client device 206, confidence level of biometric identifiers provided relative to the authentication request, the identity of the particular client device 206, whether the particular client device 206 is a shared device or personal device, the user-agent string presented by the client device 206, and other runtime indicators. The runtime indicators may also include passwords, keys, and one-time passwords (e.g., such as those generated by the local authentication factors 264 (FIG. 2)).

In some cases, the runtime authentication assurance 242 may be computed by a client-side authentication assurance engine 263 (FIG. 2). In various embodiments, the runtime authentication assurance 242 may be temporarily increased for purposes of user experience when a runtime-provided input indicates that a user is not capable of responding to one or more authentication challenges. For instance, a runtime-provided input may indicate that a trusted channel of communication is unavailable (e.g., when a user is out of cellular range, the user cannot respond to a short message service (SMS) text message). Thus, a runtime-provided input may indicate that a user-experience impact associated with an additional authentication challenge can negate an elapsed time since a historical input was provided.

In box 512, the authentication service 215 determines a composite authentication assurance 245 (FIG. 2) that is a combination of both the historical authentication assurance 239 and runtime authentication assurance 242. For example, the historical authentication assurance 239 and the runtime authentication assurance 242 may each be weighted by a respective (and possibly different) weighting value and then summed together to create the composite measure. In some cases, in computing the composite authentication assurance 245, the contribution of the historical authentication assurance 239 may be nullified in response to the runtime authentication assurance 242 meeting a threshold, or the contribution of the runtime authentication assurance 242 may be nullified in response to the historical authentication assurance 239 meeting a threshold.

In box 515, the authentication service 215 determines a threshold from the transaction thresholds 254 (FIG. 2) based at least in part on a type of transaction requested in the authentication request. For example, some transactions may be a relatively low risk, requiring a relatively low threshold of authentication assurance, but other transactions may be relatively high risk, requiring a relatively high threshold of authentication assurance.

In box 518, the authentication service 215 determines whether the composite authentication assurance 245 meets the threshold. If the authentication service 215 determines that the composite authentication assurance 245 meets the threshold, the authentication service 215 moves to box 521 and authenticates the user at the client device 206 to perform the requested transaction. The authentication service 215 may issue a new token indicating authentication to the client device 206 or associate an existing token of the client device 206 with the authenticated state. In some cases, a different client device 206 may be authorized to perform the transaction other than the client device 206 that originated the authentication request. For example, a user might request via a voice interface device that a digital movie be purchased and played via a television device, and the authorized transaction may be to show the movie on the television device. Thereafter, the operation of the portion of the authentication service 215 ends.

If instead the authentication service 215 determines that the composite authentication assurance 245 does not meet or falls beneath the threshold, the authentication service 215 moves to box 524 and presents one or more authentication challenges. For example, the authentication challenges may require a user to provide a biometric identifier, answer a knowledge-based question, select a link or notification sent to a mobile phone, select a link in an email, provide a code sent through a trusted channel of communication, enter a password, and/or provide other information that can be used to confirm the user's identity. It is noted that the authentication challenges can be presented and responded through the same client device 206 that originated the authentication request or through different client devices 206.

In box 527, the authentication service 215 determines the authentication challenge(s) have been passed. In some cases, only a subset of the set of authentication challenges presented in box 524 may be required to be passed in order for the client device 206 to be authenticated. If the authentication challenge(s) are not passed, the authentication service 215 moves from box 527 to box 530 and rejects the authentication request. As a consequence, the requested transaction is not performed, and the client device 206 is precluded from accessing the associated secured resource of the account. Thereafter, the operation of the portion of the authentication service 215 ends.

If the authentication service 215 determines instead in box 527 that the authentication challenge(s) are passed, the authentication service 215 returns from box 527 to box 518 and reevaluates whether the composite authentication assurance 245 meets the threshold considering authentication assurance contribution of passing the authentication challenge(s). The authentication service 215 may follow this with additional challenges in box 524 or authenticating the user in box 521.

Figure 6:
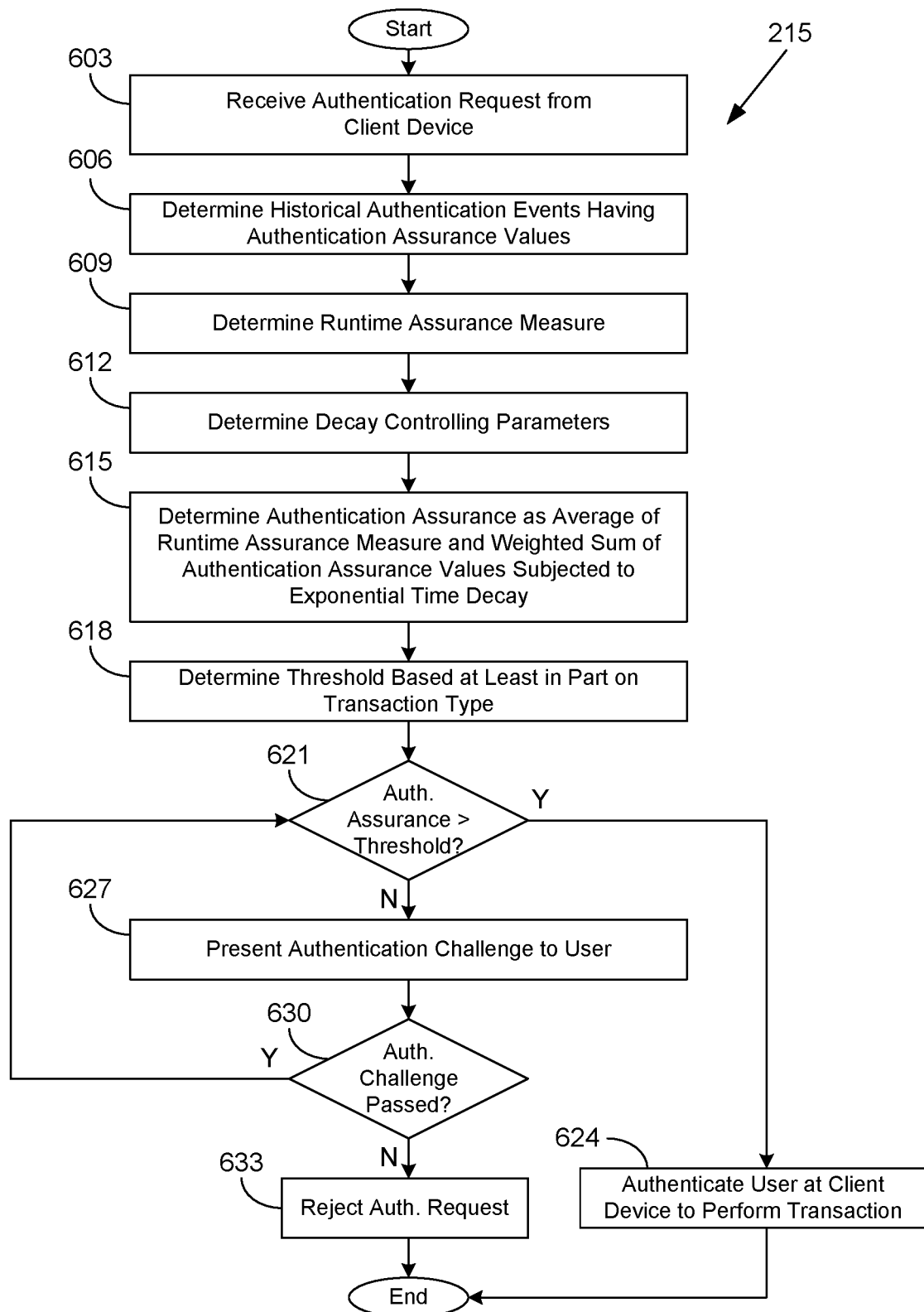

Continuing to FIG. 6, shown is a flowchart that provides one example of the operation of a portion of the authentication service 215 according to various embodiments. It is understood that the flowchart of FIG. 6 provides merely an example of the many different types of functional arrangements that may be employed to implement the operation of the portion of the authentication service 215 as described herein. As an alternative, the flowchart of FIG. 6 may be viewed as depicting an example of elements of a method implemented in the computing environment 203 (FIG. 2) according to one or more embodiments.

Beginning with box 603, the authentication service 215 receives an authentication request via a network 209 (FIG. 2). The request may be received directly or indirectly from a client device 206 (FIG. 2) associated with an account. The request may be received from a proxy device or another service, such as identity provider. The authentication request may correspond to an explicit request to log into an account or a request to access a secured resource or perform a transaction, where accessing the secured resource or performing the transaction requires authentication.

In box 606, the authentication service 215 determines the historical authentication events 227 (FIG. 2) associated with the account, where the individual historical authentication events 227 have corresponding individual authentication assurance values. The authentication assurance values may be assigned to the historical authentication events 227 based at least in part on the type of authentication challenge and/or the confidence level associated with verifying the response to the authentication challenge. For example, providing a one-time password received via text message may be associated with a higher authentication assurance value, while voice recognition of a verbal command may have a lower authentication assurance value due to the possibility of other voices or replay attacks being similarly recognized. Further, there may be a confidence level indicating whether a voice or other biometric factor is correctly recognized.

In box 609, the authentication service 215 may determine a measure of runtime authentication assurance 242, which may include an authentication confidence level for an authentication factor provided with or relative to the authentication request. For example, the authentication request may be generated relative to a voice command, and the authentication confidence level may correspond to a confidence level that the voice command was spoken by an authorized user associated with the account. In one implementation, the authentication confidence level is provided on a scale between zero (no confidence) and one (full confidence). In some cases, the authentication confidence level may be provided by a client-side authentication assurance engine 263 (FIG. 2).

In box 612, the authentication service 215 determines one or more parameters for controlling an algorithmic decay model 248 (FIG. 2). The parameters may include a half-life value, which corresponds to the time at which the authentication assurance level reaches half of its original value. In various embodiments, the half-life value may differ based at least in part on the number of users of the client device 206, or whether client device 206 used by the account is a personal device or is shared by a plurality of users. Similarly, the half-life value may differ based at least in part on whether the account is shared by multiple users or is a personal account. If the account is a single-user account or if the client device 206 is a personal device, it may make sense to have a longer half-life value as it may be less likely that the account or client device 206 may be compromised by an unauthorized user. The parameters may set a maximum authentication assurance value, a minimum authentication assurance value, and/or other parameters. In various scenarios, parameters for the algorithmic decay models 248 may be controlled based at least in part on the operation of a machine learning model 251 (FIG. 2) that is trained on data indicating times until actual compromises for various types of authentication events.

In box 615, the authentication service 215 determines a composite authentication assurance 245 (FIG. 2) as being an average of the runtime authentication assurance 242 and a weighted sum of historical authentication assurance values, where the authentication assurance values are subjected to an exponential time decay as controlled by one or more algorithmic decay models 248. The time decay is performed based on a respective timestamp associated with the individual authentication assurance values. Also, the time decay may differ for the individual authentication assurance values.

In box 618, the authentication service 215 determines a threshold from the transaction thresholds 254 (FIG. 2) based at least in part on a type of transaction requested in the authentication request. For example, some transactions may be a relatively low risk, requiring a relatively low threshold of authentication assurance, but other transactions may be relatively high risk, requiring a relatively high threshold of authentication assurance.

In box 621, the authentication service 215 determines whether the composite authentication assurance 245 meets the threshold. If the authentication service 215 determines that the composite authentication assurance 245 meets the threshold, the authentication service 215 moves to box 624 and authenticates the user at the client device 206 to perform the requested transaction. The authentication service 215 may issue a new token indicating authentication to the client device 206 or associate an existing token of the client device 206 with the authenticated state. In some cases, a different client device 206 may be authorized to perform the transaction other than the client device 206 that originated the authentication request. For example, a user might request via a voice interface device that a digital movie be purchased and played via a television device, and the authorized transaction may be to show the movie on the television device. Thereafter, the operation of the portion of the authentication service 215 ends.

If instead the authentication service 215 determines that the composite authentication assurance 245 does not meet or falls beneath the threshold, the authentication service 215 moves to box 627 and presents one or more authentication challenges. For example, the authentication challenges may require a user to provide a biometric identifier, answer a knowledge-based question, select a link or notification sent to a mobile phone, select a link in an email, provide a code sent through a trusted channel of communication, enter a password, and/or provide other information that can be used to confirm the user's identity. It is noted that the authentication challenges can be presented and responded through the same client device 206 that originated the authentication request or through different client devices 206.

In box 630, the authentication service 215 determines the authentication challenge(s) have been passed. In some cases, only a subset of the set of authentication challenges presented in box 627 may be required to be passed in order for the client device 206 to be authenticated. If the authentication challenge(s) are not passed, the authentication service 215 moves from box 630 to box 633 and rejects the authentication request. As a consequence, the requested transaction is not performed, and the client device 206 is precluded from accessing the associated secured resource of the account. Thereafter, the operation of the portion of the authentication service 215 ends.

If the authentication service 215 determines instead in box 630 that the authentication challenge(s) are passed, the authentication service 215 returns from box 630 to box 621 and reevaluates whether the composite authentication assurance 245 meets the threshold considering authentication assurance contribution of passing the authentication challenge(s). The authentication service 215 may follow this with additional challenges in box 627 or authenticating the user in box 624.

Although the examples of FIGS. 4-6 involve an initial authentication request, it is understood that the functionality of FIGS. 4-6 may be performed on a continuous basis as a client device 206 accesses account resources or performs transactions and as authentication assurance measures change. For example, the confidence level for a user's voice may be updated continuously as the user provides additional speech for analysis through further voice commands.

Rather than the outcome of initially authenticating the user or client device 206, the outcome may be confirming the authenticated status of the user or client device 206. Similarly, rather than rejecting the authentication request, for a previously authenticated user or client device 206, the outcome may be revoking an authenticated status of the user or client device 206. Revoking this authenticated status may involve revoking access tokens or blocking transactions or access to resources.

Figure 7:
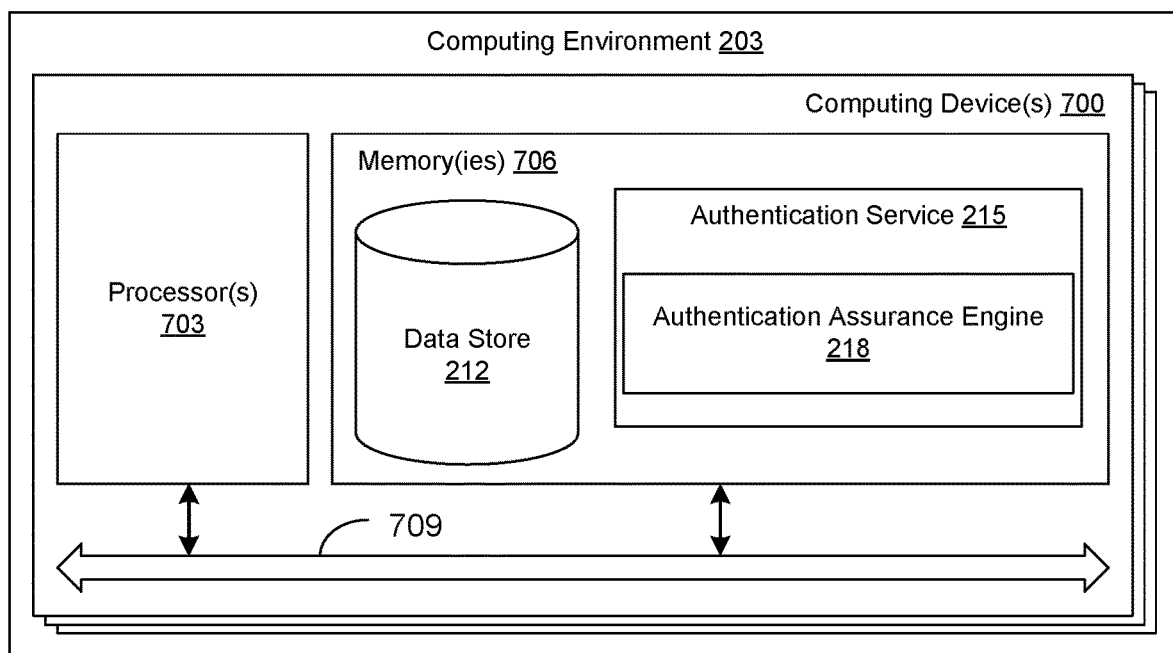
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the authentication service 215, the authentication assurance engine 218, and potentially other applications. Also stored in the memory 706 may be a data store 212 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the authentication service 215, the authentication assurance engine 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowcharts of FIGS. 4-6 show the functionality and operation of an implementation of portions of the authentication service 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authentication service 215 and the authentication assurance engine 218, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the authentication service 215 and the authentication assurance engine 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203.

Embodiments of the disclosure can be described in view of the following clauses:

Clause 1. A non-transitory computer-readable medium embodying a program executable in at least one computing device, wherein when executed the program causes the at least one computing device to at least: receive an authentication request from a client device responsive to an input from a user via a user interface, wherein the client device is associated with an account, and the account is shared by a plurality of users; determine a user-level measure of authentication assurance corresponding to the user; determine an account-level measure of authentication assurance corresponding to the account; determine a composite measure of authentication assurance from a combination of the user-level measure of authentication assurance and the account-level measure of authentication assurance; determine a threshold based at least in part on a type of transaction associated with the authentication request; compare the composite measure of authentication assurance to the threshold; authenticate the user in response to determining that the composite measure of authentication assurance meets the threshold; and present an authentication challenge to the user in response to determining that the composite measure of authentication assurance does not meet the threshold.

Clause 2. The non-transitory computer-readable medium of clause 1, wherein the account-level measure of authentication assurance is based at least in part on authentication events associated with at least one other user in the plurality of users.

Clause 3. The non-transitory computer-readable medium of clauses 1 to 2, wherein the authentication challenge is presented to the user via another client device associated with the user and not the plurality of users other than the user.

Clause 4. A system, comprising: at least one computing device; and an authentication assurance engine executable in the at least one computing device, wherein when executed the authentication assurance engine causes the at least one computing device to at least: receive an authentication request associated with an account responsive to an input from a user via a user interface; determine a user-level measure of authentication assurance corresponding to the user; determine an account-level measure of authentication assurance corresponding to the account; determine a composite measure of authentication assurance from a combination of the user-level measure of authentication assurance and the account-level measure of authentication assurance; and cause a response to the authentication request to be generated based at least in part on comparing the composite measure of authentication assurance to a threshold.

Clause 5. The system of clause 4, wherein a contribution of the user-level measure of authentication assurance to the composite measure of authentication assurance is nullified in response to the account-level measure of authentication assurance meeting another threshold.

Clause 6. The system of clauses 4 to 5, wherein a contribution of the account-level measure of authentication assurance to the composite measure of authentication assurance is nullified in response to the user-level measure of authentication assurance meeting another threshold.

Clause 7. The system of clauses 4 to 6, wherein the response comprises approving the authentication request without a further authentication challenge in response to the composite measure of authentication assurance meeting the threshold.

Clause 8. The system of clauses 4 to 7, wherein the response comprises presenting a further authentication challenge to the user in response to the composite measure of authentication assurance falling beneath the threshold.

Clause 9. The system of clauses 4 to 8, wherein when executed the authentication assurance engine causes the at least one computing device to determine the threshold based at least in part on a type of transaction associated with the authentication request.

Clause 10. The system of clauses 4 to 9, wherein the user is associated with a plurality of accounts, and the account is one of the plurality of accounts.

Clause 11. The system of clauses 4 to 10, wherein the account is associated with a plurality of users, and the user is one of the plurality of users.

Clause 12. The system of clause 11, wherein the account-level measure of authentication assurance is based at least in part on a previous authentication event for the account by a different one of the plurality of users or an unrecognized user.

Clause 13. The system of clauses 4 to 12, wherein the user-level measure of authentication assurance and the account-level measure of authentication assurance are weighted differently in determining the composite measure of authentication assurance.

Clause 14. A method, comprising: receiving, via at least one of one or more computing devices, an authentication request associated with an account responsive to an input from a user via a user interface; determining, via at least one of the one or more computing devices, a user-level measure of authentication assurance corresponding to the user; determining, via at least one of the one or more computing devices, an account-level measure of authentication assurance corresponding to the account; determining, via at least one of the one or more computing devices, a composite measure of authentication assurance from a combination of the user-level measure of authentication assurance and the account-level measure of authentication assurance; and causing, via at least one of the one or more computing devices, an authentication challenge to be presented to the user based at least in part on comparing the composite measure of authentication assurance to a threshold.

Clause 15. The method of clause 14, further comprising: evaluating, via at least one of the one or more computing devices, an authentication factor presented by the user in the authentication request; and wherein the user-level measure of authentication assurance is based at least in part on a confidence in the authentication factor.

Clause 16. The method of clause 15, wherein the authentication factor is a biometric authentication factor.

Clause 17. The method of clauses 14 to 16, wherein the account-level measure of authentication assurance incorporates an evaluation of authentication events for the account independent of the user.

Clause 18. The method of clauses 14 to 17, wherein the client device and the account are shared by a plurality of users.

Clause 19. The method of clauses 14 to 18, further comprising selecting, via at least one of the one or more computing devices, the authentication challenge from a plurality of authentication challenges based at least in part on the composite measure of authentication assurance.

Clause 20. The method of clauses 14 to 19, further comprising determining, via at least one of the one or more computing devices, the threshold based at least in part on a resource requested by the authentication request.

Clause 21. A non-transitory computer-readable medium embodying a program executable in at least one computing device, wherein when executed the program causes the at least one computing device to at least: receive an authentication request from a client device associated with an account; determine a historical measure of authentication assurance associated with the account based at least in part on at least one historical input, wherein a time decay is applied to the at least one historical input in determining the historical measure of authentication assurance; determine a runtime measure of authentication assurance associated with the account based at least in part on at least one runtime-provided input received relative to the authentication request; determine a composite measure of authentication assurance from a combination of the historical measure of authentication assurance and the runtime measure of authentication assurance; compare the composite measure of authentication assurance with a threshold associated with a requested transaction; authenticate the client device to perform the requested transaction in response to determining that the composite measure of authentication assurance meets the threshold; and present at least one authentication challenge to a user at the client device in response to determining that the composite measure of authentication assurance does not meet the threshold.

Clause 22. The non-transitory computer-readable medium of clause 21, wherein the at least one runtime-provided input indicates that the user is not capable of responding to a type of authentication challenge, and the at least one authentication challenge is selected to exclude the type of authentication challenge.

Clause 23. The non-transitory computer-readable medium of clauses 21 to 22, wherein the runtime measure of authentication assurance is increased in response to determining that at least one runtime-provided input indicates that the user is not capable of responding to the at least one authentication challenge.

Clause 24. A system, comprising: at least one computing device; and an authentication assurance engine executable in the at least one computing device, wherein when executed the authentication assurance engine causes the at least one computing device to at least: receive an authentication request associated with an account; determine a historical measure of authentication assurance from at least one historical input associated with the account; determine a runtime measure of authentication assurance from at least one runtime-provided input associated with the account received relative to the authentication request; determine a composite measure of authentication assurance from a combination of the historical measure of authentication assurance and the runtime measure of authentication assurance; and cause a response to the authentication request to be generated based at least in part on the composite measure of authentication assurance.

Clause 25. The system of clause 24, wherein the response to the authentication request is an authentication challenge selected from a plurality of potential authentication challenges based at least in part on the composite measure of authentication assurance.

Clause 26. The system of clauses 24 to 25, wherein the at least one runtime-provided input negates the at least one historical input in determining the composite measure of authentication assurance.

Clause 27. The system of clauses 24 to 26, wherein the at least one historical input negates the at least one runtime-provided input in determining the composite measure of authentication assurance.

Clause 28. The system of clauses 24 to 27, wherein the at least one runtime-provided input indicates that a trusted channel of communication associated with the account is not available.

Clause 29. The system of clauses 24 to 28, wherein the at least one historical input corresponds to a successful authentication for the account to which a time-decayed weighting has been applied.

Clause 30. The system of clauses 24 to 29, wherein the at least one historical input indicates previous malicious activity associated with the account.

Clause 31. The system of clauses 24 to 30, wherein the at least one runtime-provided input indicates that a user-experience impact associated with an additional authentication challenge negates an elapsed time since the at least one historical input was provided.

Clause 32. The system of clauses 24 to 31, wherein the at least one runtime-provided input indicates a current location of a client device.

Clause 33. The system of clauses 24 to 32, wherein the at least one runtime-provided input indicates an environmental factor associated with an environment surrounding the client device.

Clause 34. A method, comprising: receiving, via at least one of one or more computing devices, an authentication request associated with an account; determining, via at least one of the one or more computing devices, a historical measure of authentication assurance associated with the account based at least in part on at least one historical input; determining, via at least one of the one or more computing devices, a runtime measure of authentication assurance associated with the account based at least in part on at least one runtime-provided input received relative to the authentication request; determining, via at least one of the one or more computing devices, a composite measure of authentication assurance from a combination of the historical measure of authentication assurance and the runtime measure of authentication assurance; and causing, via at least one of the one or more computing devices, a response to the authentication request to be generated based at least in part on the composite measure of authentication assurance.

Clause 35. The method of clause 34, further comprising determining, via at least one of the one or more computing devices, the runtime measure of authentication assurance based at least in part on a machine learning model applied to the runtime-provided input and trained on historical data associated with a plurality of accounts.

Clause 36. The method of clauses 34 to 35, further comprising determining, via at least one of the one or more computing devices, the historical measure of authentication assurance based at least in part on a time decay applied to the at least one historical input.

Clause 37. The method of clauses 34 to 36, further comprising determining, via at least one of the one or more computing devices, the response to the authentication request based at least in part on comparing the composite measure of authentication assurance to a threshold associated with a requested transaction.

Clause 38. The method of clauses 34 to 37, wherein the response comprises authenticating the client device for access to a resource of the account.

Clause 39. The method of clauses 34 to 38, wherein the response comprises at least one authentication challenge involving at least one other client device.

Clause 40. The method of clauses 34 to 39, wherein the response comprises at least one biometric authentication challenge.

Clause 41. A non-transitory computer-readable medium embodying a program executable in at least one computing device, wherein when executed the program causes the at least one computing device to at least: receive an authentication request associated with an account from a user at a client device, the authentication request including an authentication confidence level corresponding to a biometric authentication factor provided by the user; determine a plurality of historical authentication events associated with the account; determine a measure of authentication assurance as an average of the authentication confidence level and a weighted sum of a plurality of authentication assurance values subjected to an exponential time decay and individually corresponding to the plurality of historical authentication events; and cause a response to the authentication request to be generated based at least in part on comparing the measure of authentication assurance to a threshold.

Clause 42. The non-transitory computer-readable medium of clause 41, wherein the threshold is selected from a plurality of thresholds based at least in part on a requested transaction for the account.

Clause 43. The non-transitory computer-readable medium of clauses 41 to 42, wherein when executed the program further causes the at least one computing device to at least determine a half-life value for the exponential time decay based at least in part on a number of users of the client device.

Clause 44. A system, comprising: at least one computing device; and an authentication assurance engine executable in the at least one computing device, wherein when executed the authentication assurance engine causes the at least one computing device to at least: receive an authentication request associated with an account; determine at least one historical authentication event associated with the account; determine a measure of authentication assurance based at least in part on applying an exponential time decay to at least one authentication assurance value individually corresponding to the at least one historical authentication event; and cause a response to the authentication request to be generated based at least in part on the measure of authentication assurance.

Clause 45. The system of clause 44, wherein the exponential time decay is applied to a timestamp of the at least one historical authentication event that indicates when a successful authentication was performed.

Clause 46. The system of clauses 44 to 45, wherein the at least one authentication assurance value comprises a plurality of authentication assurance values, and the measure of authentication assurance is a weighted sum of the plurality of authentication assurance values that have been exponentially time decayed.

Clause 47. The system of clauses 44 to 46, wherein when executed the authentication assurance engine further causes the at least one computing device to at least generate at least one parameter to control the exponential time decay based at least in part on a machine learning model trained on data indicating elapsed times after authentication events until security compromises occur.

Clause 48. The system of clauses 44 to 47, wherein the at least one authentication assurance value comprises a plurality of authentication assurance values, and when executed the authentication assurance engine further causes the at least one computing device to at least: receive a measure of runtime authentication assurance for the account; and determine the measure of authentication assurance based at least in part on an average of the measure of runtime authentication assurance and a weighted sum of the plurality of authentication assurance values that have been exponentially time decayed.

Clause 49. The system of clause 48, wherein the measure of runtime authentication assurance corresponds to a confidence in a biometric recognition corresponding to the authentication request.

Clause 50. The system of clauses 48 to 49, wherein the measure of runtime authentication assurance is generated in a client device from which the authentication request is received.

Clause 51. The system of clauses 44 to 50, wherein the exponential time decay uses a half-life value selected based at least in part on whether the account is shared by a plurality of users.

Clause 52. The system of clauses 44 to 51, wherein when executed the authentication assurance engine further causes the at least one computing device to at least: determine a threshold corresponding to a requested transaction associated with the authentication request; and cause the response to the authentication request to be generated based at least in part on comparing the measure of authentication assurance to the threshold.

Clause 53. The system of clause 52, wherein the threshold is selected from a plurality of possible thresholds.

Clause 54. A method, comprising: receiving, via at least one of one or more computing devices, an authentication request associated with an account; determining, via at least one of the one or more computing devices, at least one historical authentication event associated with the account; determining, via at least one of the one or more computing devices, a measure of authentication assurance based at least in part on applying an exponential time decay to at least one authentication assurance value individually corresponding to the at least one historical authentication event; determining, via at least one of the one or more computing devices, a threshold for a transaction associated with the authentication request; and causing, via at least one of the one or more computing devices, a response to the authentication request to be generated based at least in part on comparing the measure of authentication assurance to the threshold.

Clause 55. The method of clause 54, further comprising receiving, via at least one of the one or more computing devices, an authentication confidence level from the authentication request, wherein the measure of authentication assurance is determined further based at least in part on the authentication confidence level.

Clause 56. The method of clauses 54 to 55, further comprising selecting, via at least one of the one or more computing devices, a half-life value for the exponential time decay based at least in part on whether the account is a personal account associated with a single user.

Clause 57. The method of clauses 54 to 56, further comprising generating, via at least one of the one or more computing devices, at least one parameter to control the exponential time decay based at least in part on a machine learning model trained on data indicating elapsed times after authentication events until security compromises occur.

Clause 58. The method of clauses 54 to 57, wherein the at least one authentication assurance value comprises a plurality of authentication assurance values, and the method further comprises calculating, via at least one of the one or more computing devices, the measure of authentication assurance as a weighted sum of the plurality of authentication assurance values that have been exponentially time decayed.

Clause 59. The method of clauses 54 to 58, further comprising applying, via at least one of the one or more computing devices, the exponential time decay to a timestamp of the at least one historical authentication event that indicates when a successful authentication was performed.

Clause 60. The method of clauses 54 to 59, wherein the at least one historical authentication event comprises a plurality of historical authentication events, and the exponential time decay differs for individual ones of the plurality of historical authentication events.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   receive an authentication request from a client device associated with an account;
   determine a historical measure of authentication assurance associated with the account based at least in part on at least one historical input, wherein a time decay is applied to the at least one historical input in determining the historical measure of authentication assurance;
   determine a runtime measure of authentication assurance associated with the account based at least in part on at least one runtime-provided input received relative to the authentication request, wherein the runtime measure of authentication assurance is increased in response to determining that at least one runtime-provided input indicates that a trusted channel of communication is unavailable to the account, thereby making the account incapable of responding to the at least one authentication challenge;
   determine a composite measure of authentication assurance from a combination of the historical measure of authentication assurance and the runtime measure of authentication assurance;
   compare the composite measure of authentication assurance with a threshold associated with a requested transaction;
   authenticate the client device to perform the requested transaction in response to determining that the composite measure of authentication assurance meets the threshold; and
   present at least one authentication challenge to a user at the client device in response to determining that the composite measure of authentication assurance does not meet the threshold.

2. The non-transitory computer-readable medium of claim 1, wherein the at least one runtime-provided input indicates that the user is not capable of responding to a type of authentication challenge, and the at least one authentication challenge is selected to exclude the type of authentication challenge.

3. The non-transitory computer-readable medium of claim 1, wherein the trusted channel of communication that is unavailable corresponds to text messaging when a cellular telephone of the user is out of range of a cellular signal.

4. A system, comprising:
   at least one computing device; and
   an authentication assurance engine executable in the at least one computing device, wherein when executed the authentication assurance engine causes the at least one computing device to at least:
      receive an authentication request associated with an account;
      determine a historical measure of authentication assurance from at least one historical input associated with the account;
      determine a runtime measure of authentication assurance from at least one runtime-provided input associated with the account received relative to the authentication request, wherein the at least one runtime-provided input indicates that a user-experience impact associated with an additional authentication challenge that negates an elapsed time since the at least one historical input was provided, the user-experience impact resulting from a trusted channel of communication being unavailable to complete the additional authentication challenge, the elapsed time being a factor that reduces the runtime measure of authentication assurance;
      determine a composite measure of authentication assurance from a combination of the historical measure of authentication assurance and the runtime measure of authentication assurance; and
      cause a response to the authentication request to be generated based at least in part on the composite measure of authentication assurance.

5. The system of claim 4, wherein the response to the authentication request is an authentication challenge selected from a plurality of potential authentication challenges based at least in part on the composite measure of authentication assurance.

6. The system of claim 4, wherein the at least one runtime-provided input negates the at least one historical input in determining the composite measure of authentication assurance.

7. The system of claim 4, wherein the at least one historical input negates the at least one runtime-provided input in determining the composite measure of authentication assurance.

8. The system of claim 4, wherein the at least one runtime-provided input indicates that a trusted channel of communication associated with the account is not available.

9. The system of claim 4, wherein the at least one historical input corresponds to a successful authentication for the account to which a time-decayed weighting has been applied.

10. The system of claim 4, wherein the at least one historical input indicates previous malicious activity associated with the account.

11. The system of claim 4, wherein the at least one runtime-provided input indicates a current location of a client device.

12. The system of claim 4, wherein the at least one runtime-provided input indicates an environmental factor associated with an environment surrounding the client device.

13. A method, comprising:
   receiving, via at least one of one or more computing devices, an authentication request associated with an account;
   determining, via at least one of the one or more computing devices, a historical measure of authentication assurance associated with the account based at least in part on at least one historical input;
   determining, via at least one of the one or more computing devices, a runtime measure of authentication assurance associated with the account based at least in part on at least one runtime-provided input received relative to the authentication request, wherein the runtime measure of authentication assurance is increased in response to determining that at least one runtime-provided input indicates that a trusted channel of communication is unavailable to the account, thereby making the account incapable of responding to the at least one authentication challenge;
   determining, via at least one of the one or more computing devices, a composite measure of authentication assurance from a combination of the historical measure of authentication assurance and the runtime measure of authentication assurance; and
   causing, via at least one of the one or more computing devices, a response to the authentication request to be generated based at least in part on the composite measure of authentication assurance.

14. The method of claim 13, further comprising determining, via at least one of the one or more computing devices, the historical measure of authentication assurance based at least in part on a time decay applied to the at least one historical input.

15. The method of claim 13, further comprising determining, via at least one of the one or more computing devices, the response to the authentication request based at least in part on comparing the composite measure of authentication assurance to a threshold associated with a requested transaction.

16. The method of claim 13, wherein the response comprises authenticating the client device for access to a resource of the account.

17. The method of claim 13, wherein the response comprises at least one authentication challenge involving at least one other client device.

18. The method of claim 13, wherein the response comprises at least one biometric authentication challenge.

19. The method of claim 13, wherein the at least one runtime-provided input indicates that a user-experience impact associated with an additional authentication challenge that negates an elapsed time since the at least one historical input was provided, the user-experience impact resulting from the trusted channel of communication being unavailable to complete the additional authentication challenge.

20. The method of claim 19, wherein the trusted channel of communication that is unavailable corresponds to text messaging when a cellular telephone associated with the account is out of range of a cellular signal.

21. The method of claim 13, further comprising determining, via at least one of the one or more computing devices, the runtime measure of authentication assurance based at least in part on a machine learning model applied to the runtime-provided input and trained on historical data associated with a plurality of accounts.

\* \* \* \* \*